(12) United States Patent
Buschjohann et al.

(10) Patent No.: US 8,579,307 B2
(45) Date of Patent: Nov. 12, 2013

(54) AXLE SUPPORT, ESPECIALLY FRONT AXLE SUPPORT FOR MOTOR VEHICLES

(75) Inventors: Thomas Buschjohann, Nordstemmen (DE); Juergen Eickmann, Schellerten (DE); Heiko Kauert, Blankenfelde (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 13/375,891

(22) PCT Filed: Jun. 29, 2010

(86) PCT No.: PCT/DE2010/000746
§ 371 (c)(1),
(2), (4) Date: Jan. 5, 2012

(87) PCT Pub. No.: WO2011/003387
PCT Pub. Date: Jan. 13, 2011

(65) Prior Publication Data
US 2012/0104739 A1    May 3, 2012

(30) Foreign Application Priority Data

| Jul. 6, 2009 | (DE) | 10 2009 031 961 |
| Jul. 30, 2009 | (DE) | 10 2009 035 590 |
| Jun. 18, 2010 | (DE) | 10 2010 024 313 |

(51) Int. Cl.
*B60G 7/00* (2006.01)

(52) U.S. Cl.
USPC .................................. 280/124.109; 280/781

(58) Field of Classification Search
USPC ........... 280/781, 788, 124.109; 180/311, 312; 148/522
See application file for complete search history.

(56) References Cited

U.S. PATENT DOCUMENTS

| 4,453,740 | A | * | 6/1984 | von der Ohe et al. | 280/781 |
| 5,280,957 | A | * | 1/1994 | Hentschel et al. | 280/788 |
| 6,516,913 | B1 | * | 2/2003 | Hartel et al. | 180/312 |
| 6,923,474 | B2 | * | 8/2005 | Frasch et al. | 280/784 |
| 7,520,514 | B2 | * | 4/2009 | Ogawa et al. | 280/124.109 |
| 7,584,815 | B2 | * | 9/2009 | Ogawa et al. | 180/312 |
| 2005/0116434 | A1 | | 6/2005 | Kim et al. | |
| 2006/0091665 | A1 | | 5/2006 | Domin | |
| 2008/0315571 | A1 | * | 12/2008 | Cariou et al. | 280/781 |
| 2011/0193332 | A1 | * | 8/2011 | Mildner et al. | 280/781 |
| 2012/0235397 | A1 | * | 9/2012 | Kroger et al. | 280/785 |

FOREIGN PATENT DOCUMENTS

| DE | 20 2008 017 274 | 5/2009 |
| DE | 10 2010 003 471 | 10/2011 |
| EP | 0 779 204 | 6/1997 |
| EP | 0 794 106 | 9/1997 |

(Continued)

OTHER PUBLICATIONS

English translation of the International Preliminary Report on Patentability and Written Opinion of the International Searching Authority of PCT/DE2010/000746, Mailed Feb. 9, 2012.

(Continued)

*Primary Examiner* — Faye M. Fleming
(74) *Attorney, Agent, or Firm* — Collard & Roe, P.C.

(57) ABSTRACT

The invention relates to a monolithically cast axle support (12) for motor vehicles. A steering box (10) is provided which is monolithically produced as a whole or in part along with the axle support or which is integrally bonded to the axle support as a whole or in part.

25 Claims, 9 Drawing Sheets

(56) References Cited

FOREIGN PATENT DOCUMENTS

Figure 1:
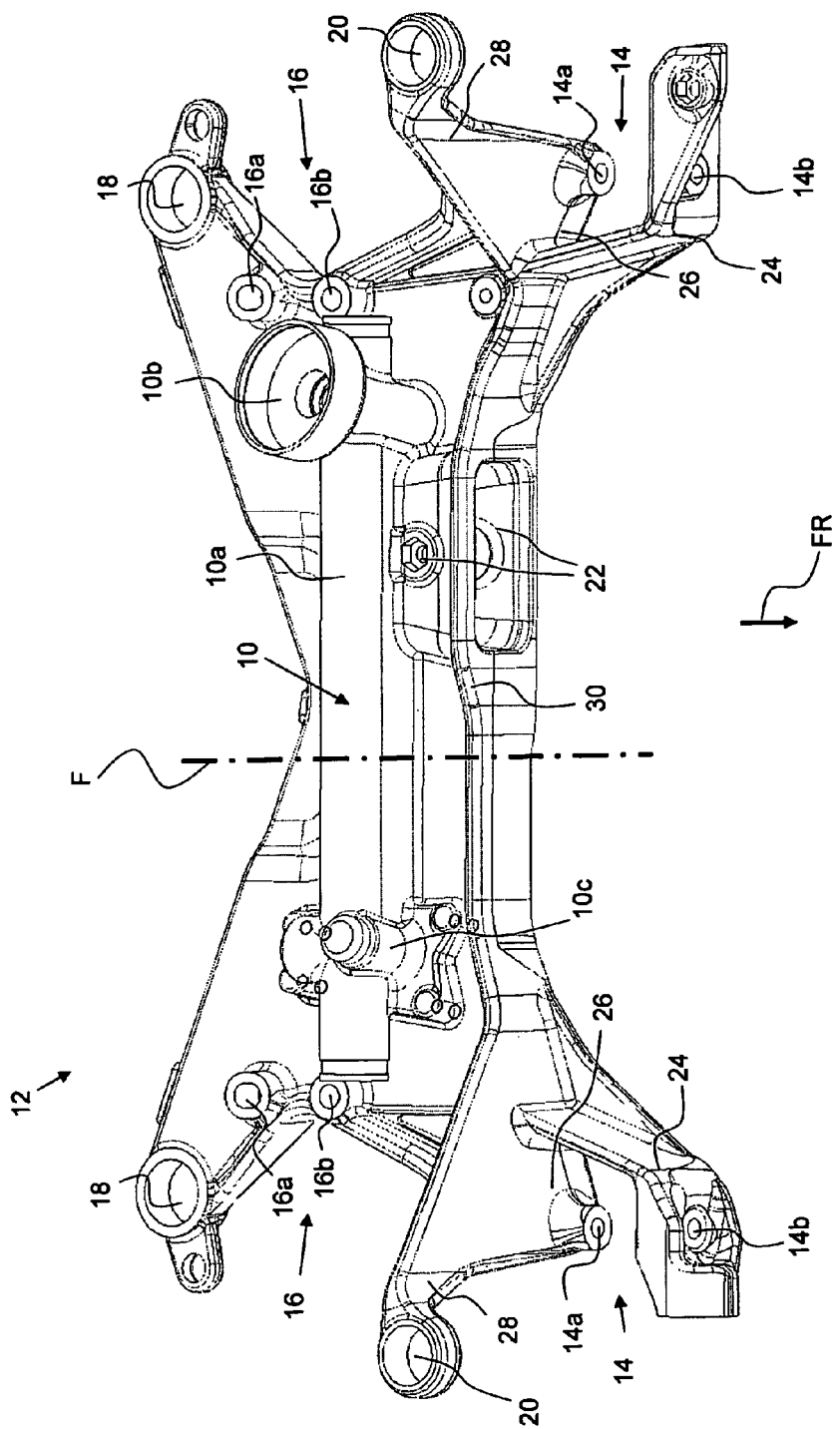

| EP | 1 504 983 | 2/2005 |
|---|---|---|
| FR | 2 615 458 | 11/1988 |
| KR | 2007 0009121 | 1/2007 |
| KR | 2009 0112175 | 10/2009 |
| WO | WO 90/05083 | 5/1990 |

OTHER PUBLICATIONS

Fahrenwaldt, Hans J./Schuler, Volkmar: Praxiswissen Schweiβtechnik [Practical Knowledge of Welding Technology], Berlin—Heidelberg, $2^{nd}$ revised and expanded edition, 2006, pp. 127-129.
International Search Report of PCT/DE2010/000746, Oct. 15, 2010.
International Search Report of PCT/DE2011/001832, date of mailing Aug. 16, 2012.

* cited by examiner

AXLE SUPPORT, ESPECIALLY FRONT AXLE SUPPORT FOR MOTOR VEHICLES

CROSS REFERENCE TO RELATED APPLICATIONS

This application is the National Stage of PCT/DE2010/000746 filed on Jun. 29, 2010, which claims priority under 35 U.S.C. §119 of German Application No. 10 2009 031 961.1 filed on Jul. 6, 2009, German Application No. 10 2009 035 590.1 filed on Jul. 30, 2009 and German Application No. 10 2010 024 313.2 filed on Jun. 18, 2010, the disclosures of each of which are incorporated herein by reference. The international application under PCT article 21(2) was not published in English.

The invention relates to an axle support, in particular a front axle support for motor vehicles.

Such axle supports, which are also known under other designations such as axle bolsters or subframes, integral frames or auxiliary frames, are attached to vehicle structures, for example to the body and/or to longitudinal members of a vehicle, as preassembled units or modules, after they are provided with assemblies or auxiliary assemblies.

The invention is based on the task of optimizing a single-piece cast axle support with regard to at least individual ones of the functions or requirements named below. For example, the axle support should accommodate as many as possible of the assemblies or auxiliary assemblies belonging to the carriage and drive system, for example all control links, the steering, the stabilizers or the drive unit, in order to prevent such assemblies or auxiliary assemblies from having to be attached directly to the vehicle structure, in particular due to requirements of assembly, body loading, comfort and rigidity. Thus, the axle support should accommodate the control links and absorb wheel forces that occur. Furthermore, it should accommodate the steering gear and stabilizers. Spring or damper forces, tensile and pressure shocks should likewise be absorbed or captured by the axle support. The axle support should also support the drive unit. In addition, the axle support should offer high rigidity in the transverse direction and increase the longitudinal elasticity in the longitudinal direction. The axle support should support elasto-kinematics, and be designed so that assembly and servicing as well as repair are simplified. In addition, the axle support should allow cost-effective manufacturing of the kinematic connecting points, so-called hard points, with close tolerance. To this end, the axle support should have sufficient strength at the connecting points and withstand continuous loads. It should fulfill high requirements for rigidities, natural frequencies and crash behavior, be as light as possible, be producible cost-effectively with as few individual parts and welded joints as possible, include as many chassis components as possible and allow them to be adjusted, require as little construction space as possible, suppress the transmission of noises, in particular roadway noises, and vibrations, in particular wheel vibrations, and enable easy installation and removal.

According to the invention, this is achieved in that a steering housing is provided in the single-piece cast axle support, which housing is produced entirely or partially and in a single piece together with the axle support.

Such a steering housing contained in the axle support enables optimization of the axle support in particular with regard to the demands made on an axle support for comfort, safety and rigidity.

It has specifically been found that a steering housing produced in a single piece with the axle support, in its entirety or in parts, depending on the arrangement within the axle support, can absorb wheel forces and absorb spring or damper forces, tensile and pressure shocks. In particular, the part of the steering housing disposed in the transverse direction in the single-piece cast axle support, in which the steering rod is movably disposed, results in a significant improvement of the transverse rigidity, but also of the torsional rigidity. In addition, according to the invention, the demands made for rigidities, natural frequencies and crash behavior can be optimized or even better fulfilled by the steering housing cast in a single piece with the axle support.

For certain applications, it can be advantageous if the steering housing is entirely or partially connected to the axle support, and also by material bonding.

Such a steering housing connected to the axle support likewise enables optimization of the axle support in particular with regard to the demands made on an axle support for comfort, safety and rigidity.

It has specifically been found that, on the one hand, such a steering housing produced separately and integrated by material bonding into the single-piece cast axle support, depending on the arrangement within the axle support, can absorb wheel forces and absorb spring or damper forces, tensile and pressure shocks. In particular, the part of the steering housing disposed in the transverse direction in the single-piece cast axle support, in which the steering rod link is axially movable or displaceably disposed, results in a significant improvement of the transverse rigidity, but also of the torsional rigidity. In addition, according to the invention, the demands made for rigidities, natural frequencies and crash behavior can be optimized or even better fulfilled by means of the steering housing materially bonded to the axle support cast in a single piece.

A materially bonded connection is a connection in which the components, here in particular the axle support and steering housing, are connected to one another so intimately that the forces that occur in operation are transmitted by means of cohesion and adhesion. Such a connection is inseparable, i.e. the parts can only be separated by destroying the joined components, or broken down again into its component parts by destroying the connecting element.

Despite the measures according to the invention, the axle support can still be of relatively light design, since the steering housing is preferably essentially a tubular hollow profile, into which the steering rod can be introduced so that it is displaceable or axially movable. Advantageously, material can even by saved by the steering housing integrated into the axle support, if the steering housing makes a cross strut within the axle support, which would otherwise be necessary, superfluous.

The axle support itself preferably has a basic body that can be designed in frame-like manner, with reinforcement struts, or with a largely closed base surface provided only with the necessary recesses or receptacles for attachment/mounting of chassis components.

It can be advantageous if the part of the steering housing cast in a single piece together with the axle support is designed as a half-shell. By means of such a half-shell, the purpose according to the invention, in particular of increasing the rigidity of the axle support, is achieved. In this case, the half-shell forms a part of the tubular hollow profile of the steering housing, in which the steering rod is displaceably disposed. An advantage in this case is that the steering rod, possibly along with other components, can be introduced into the half-shell in an extremely assembly-friendly way, and can then be locked together with another half-shell. Preferably, releasable connecting techniques are used for the locking, so that the steering rod, along with other components, is quickly accessible at any time for servicing and/or repair work.

Steering housings that are part of the steering systems of ZF Lenksysteme GmbH, Schwäbisch Gmünd, Germany, known under the brand name ZF-Servolectric®, have proven to be especially suited for integration into an axle support, in particular due to their geometry.

It can be expedient if the steering housing has at least one tubular hollow body for receiving a steering rod, whereby the at least one tubular hollow body is preferably disposed on the axle body or above an imaginary horizontal plane spanned by the axle support. Where there is only one tubular hollow body, it preferably runs transverse to the longitudinal axis of the vehicle, essentially over the width of the axle support. It can also be expedient, however, if two tubular hollow bodies are provided that are disposed at a distance from one another in the edge zone of the axle support, transverse to the longitudinal direction of the vehicle, to receive a steering rod, so that the steering rod is exposed approximately in the center. In order to protect the steering rod that is exposed in the center from contamination, a covering, in particular of plastic material, preferably in the form of a bellows, can be advantageous. The two aforementioned tubular hollow profiles disposed in the edge zone are preferably connected or provided with receptacles, namely on the one side for receiving a steering shaft, and on the other side for receiving the bevel gears of a servomotor.

Furthermore, it can be expedient if the steering housing has a receptacle to support the steering shaft, whereby the receptacle preferably begins on the axle body or above an imaginary horizontal plane spanned by the axle support and ends under the axle body or beneath the imaginary horizontal plane spanned by the axle support. The receptacle has a passageway to the tubular hollow body, and is accordingly made in a single piece with or integrally joined to the hollow body.

It can be advantageous if the steering housing has a recess to receive transmission stages or a bevel gear set of the servomotor, whereby the recess preferably begins under the axle body or beneath an imaginary horizontal plane spanned by the axle support and is accessible from there, and ends on the axle body or above the imaginary horizontal plane spanned by the axle support and is closed off there. The receptacle has a passageway to the tubular hollow body, and is accordingly made in a single piece with or integrally joined to the hollow body.

Furthermore, it can be advantageous if construction space is provided under the axle support or beneath an imaginary horizontal plane spanned by the axle support, for the servomotor together with the ECU (engine control unit) or control device.

For various applications, it can be advantageous if the steering housing is only encased in and/or on the axle support, in its entirety or in parts. For other applications, it can be advantageous if the steering housing is additionally encased in and/or on the axle support, in its entirety or in parts.

For other uses, it can be advantageous if the steering housing is only coated in and/or on the axle support, in its entirety or in parts. However, for various uses it can also be advantageous if the steering housing is additionally coated in and/or on the axle support, in its entirety or in parts.

For various uses it can also be advantageous if the steering housing is only cast on, in and/or on the axle support, in its entirety or in parts. However, for individual uses it can also be advantageous if the steering housing is additionally cast on, in and/or on the axle support, in its entirety or in parts.

For other uses, it can also be advantageous if the steering housing is only coated and encased in and/or on the axle support, in its entirety or in parts. However, for other uses it can also be advantageous if the steering housing is additionally coated and encased in and/or on the axle support, in its entirety or in parts. However, for still other uses it can also be advantageous if the steering housing is coated and cast on, in and/or on the axle support, in its entirety or in parts. Finally, for certain applications it can, however, also be expedient if the steering housing is coated and cast on, in and/or on the axle support, in its entirety or in parts.

By this means, as a whole a quasi-monolithic component is obtained, which demonstrates optimized strength values in the region of the steering housing.

For certain uses, it can be advantageous if the steering housing is attached only by adhesion in and/or on the axle support, in its entirety or in parts. For certain uses, it can be expedient if the steering housing is additionally attached by adhesion in and/or on the axle support, in its entirety or in parts. For individual uses, it can be advantageous if the steering housing is attached in and/or on the axle support, in its entirety or in parts, only by welding, in particular by resistance spot welding.

For certain applications, it can be advantageous if the steering housing is additionally attached in and/or on the axle support, in its entirety or in parts, by welding, in particular by resistance spot welding. For certain uses, it can be advantageous if the steering housing is attached in and/or on the axle support, in its entirety or in parts, only by crimping specified regions of the axle support. For certain uses, it can be expedient if the steering housing is attached in and/or on the axle support, in its entirety or in parts, additionally by crimping specified areas of the axle support. For certain uses, it can be advantageous if the steering housing is attached in and/or on the axle support, in its entirety or in parts, only by clinching. For various applications, it can be advantageous if the steering housing is attached in and/or on the axle support, in its entirety or in parts, additionally by clinching. A person skilled in the art will find an overview of clinching in Fahrenwaldt, Hans J./Schuler, Volkmar: Praxiswissen Schweißtechnik [Practical Knowledge of Welding Technology], Berlin-Heidelberg, $2^{nd}$ revised and expanded edition, 2008, pp. 127-129. For various uses, it can be expedient if the steering housing is attached in and/or on the axle support, in its entirety or in parts, only by punch riveting. For various uses, it can be expedient if the steering housing is attached in and/or on the axle support, in its entirety or in parts, additionally by punch riveting. For still other uses, it can be advantageous if the steering housing is attached in and/or on the axle support, in its entirety or in parts, by means of a screw connection.

Of course, the single-piece cast axle support, in this case, is designed or has a geometry in the region of the steering housing to be received, such that the selected joining method can be readily used.

When gluing, it is practical, for example, if the section of the axle support that receives the steering housing is formed as a cast hollow profile open on one side. Gluing has the advantage that attachment of the steering housing in or on the axle support can be effected relatively quickly.

A further development of the invention provides that the axle support can be a front axle support or a rear axle support, whereby in a preferred embodiment, this support has two receptacles or recesses spaced at a distance from one another in the longitudinal direction of the vehicle for the support points, in each instance, for pivot support of each of two wheel guiding elements, such as transverse arms or wishbones, and receptacles for attaching the axle support as a prefabricated unit, together with preassembled assemblies, to the vehicle structure. Furthermore, it can be advantageous if the one-piece cast axle support has receptacles or recesses preferably for attaching a stabilizer, for supporting a torque arm, or for supporting a pendulum support. These receptacles or recesses can be connected with one another in a single piece, by means of the casting process.

Such a front axle support is especially well suited for integration of the steering housing into the axle support.

For certain applications, it can be expedient if the axle support is made of steel.

For other uses, it can be advantageous if the single-piece cast axle support is produced from a light metal, preferably aluminum, an aluminum alloy or a magnesium alloy. In addition, it can be advantageous if the single-piece cast axle support is produced using the pressure die-casting method or gravity die-casting method.

According to a further development of the invention, the steering housing consists entirely or in parts of a light metal, preferably of aluminum, an aluminum, zinc or magnesium alloy, or steel. An aluminum alloy has the advantage over steel that it is a light metal, so that it has a lighter weight than steel. Steel, in contrast, is characterized by a higher modulus of elasticity, which is beneficial in particular with regard to a desired increase in the rigidity of an axle support. But so-called hybrid aluminum can also be used advantageously for manufacturing the steering housing.

For certain uses, it can be advantageous if the steering housing consists, in its entirety or in parts, of an aforementioned light metal, profiled to increase its rigidity. For certain applications, it can be advantageous if such a steering housing is textured, in its entirety or in parts. However, for individual uses it can also be expedient if such a steering housing is profiled and textured, in its entirety or in parts.

For certain applications, it can also be advantageous if such a steering housing has only at least one reinforcement notch. For certain uses, it can also be advantageous if such a steering housing additionally has at least one reinforcement notch. Advantageously, the at least one reinforcement notch can be provided only on the inner surface of the steering housing. For certain uses, it can be advantageous if the at least one reinforcement notch is additionally provided on the outer surface of the steering housing. For yet other applications, however, it can also be advantageous if the at least one reinforcement notch is provided only on the outer surface of the steering housing.

For certain uses, it can be expedient if such a steering housing has only at least one reinforcement rib. For certain uses, however, it can also be advantageous if such a steering housing has in addition at least one reinforcement rib. Advantageously, the at least one reinforcement rib can be provided only on the inner surface of the steering housing. For certain uses, it can be advantageous if the at least one reinforcement rib is provided in addition on the outer surface of the steering housing. For still other applications, however, it can also be advantageous if the at least one reinforcement rib is provided only on the outer surface of the steering housing.

For certain uses, it can be advantageous if such a steering housing has only at least one reinforcement bead. For individual uses, however, it can also be advantageous if such a steering housing additionally has at least one reinforcement bead. Advantageously, the at least one reinforcement bead can be provided only on the inner surface of the steering housing. For certain other uses, it can be advantageous if the at least one reinforcement bead is additionally provided on the outer surface of the steering housing. For still other applications, however, it can also be advantageous if the at least one reinforcement bead is provided only on the outer surface of the steering housing.

For other applications, it can be advantageous if such a steering housing has only at least one reinforcement bulge. For individual applications, however, it can be expedient if such a steering housing additionally has at least one reinforcement bulge. Advantageously, the at least one reinforcement bulge can be provided only on the inner surface of the steering housing. For certain other uses, it can be advantageous if the at least one reinforcement bulge is additionally provided on the outer surface of the steering housing. For still other applications, however, it can also be advantageous if the at least one reinforcement bulge is provided only on the outer surface of the steering housing.

It can be expedient if the cast axle support is produced from a different material than the steering housing, preferably a different aluminum alloy, whereby the different materials, preferably different aluminum alloys, preferably differ in their melting points or alloys or alloy components.

In this connection, it can be expedient if the wall thickness of the steering housing is 0.5 to 4 mm, in its entirety or in parts, and the diameter of the steering housing is 10 to 50 mm, in its entirety or in parts.

According to a further development of the invention, the steering housing runs transverse to the longitudinal direction of the vehicle, in its entirety or in parts, whereby preferably, a tubular hollow body of the steering housing, in which the steering rod can be displaceably introduced, runs approximately over the width of the front axle support, approximately centered between the receptacles.

It can be advantageous if a part of the steering housing cast in a single piece together with the axle support is designed as a hollow profile open toward the bottom.

Such a hollow profile, open on one side, in which the steering rod or tie rod is displaceably disposed, has the advantage that the steering rod or tie rod, possibly along with other components, can be inserted into it in an extremely assembly-friendly manner. It can be advantageous if this hollow profile can then be closed with a suitable covering, in particular by gluing it. Preferably, releasable connecting techniques are used for closing, so that the steering rod along with other components is quickly accessible at any time for servicing and/or repair work.

It can be advantageous if a part of the steering housing cast in one piece together with the axle support, and possibly the axle support itself in part, is configured in roof-like manner, preferably in the transition region to the steering housing.

Such a roof-like configuration makes the axle support stiffer on the whole, and offers sufficient space to accommodate individual ones of the components necessary for the steering system, whereby these are protected under the roof-like configuration. However, such a roof, open on one side, in which the steering rod or tie rod is displaceably disposed, also has the advantage that the steering rod or tie rod can be inserted into it in an extremely assembly-friendly manner, possibly along with other components. It can be advantageous if this roof can then be closed from below with a suitable covering, in particular glued. Preferably, releasable connecting techniques are used for closing, so that the steering rod along with other components is quickly accessible at any time for servicing and/or repair work.

In particular to improve the rigidity of the axle support, it can be expedient if the roof-like configuration is provided in the transverse direction of the axle support, at least partially between the part of the steering housing for receiving a steering shaft and the part of the steering housing for receiving transmission stages.

Particularly to improve the rigidity of the axle support, it can be advantageous if the roof-like configuration of the steering housing has a sloping section that drops off in a downward direction, beginning approximately above the receiving space provided for the tie rod, and transitions directly or indirectly into a transverse wall delimiting the axle support, whereby the transverse wall is preferably configured as a reinforcement element, in particular with a thickened wall diameter, and/or is provided with at least one reinforcing rib. A transverse wall that is at the rear, in particular in the direction of travel, is preferred. It can be advantageous if the sloped section has at least one recess, in particular one that saves weight.

Particularly to improve the rigidity of the axle support, it can be advantageous if the roof-like configuration of the steering housing has a section that runs essentially vertically, which runs downward beginning approximately laterally next to the receiving area provided for the tie rod, then transitions to an approximately horizontal to sloping section and then to a transverse wall that delimits the axle support, whereby the transverse wall is preferably designed as a reinforcement element, in particular with a thickened wall diameter, and/or is provided with at least one reinforcing rib. A transverse wall that is in the front, in particular in the direction of travel, is preferred. It can be advantageous if at least one section has at least one recess, in particular one that saves weight.

Furthermore, it can be advantageous if the roof-like configuration has a ridge, preferably rounded off, running in the transverse direction approximately above the receiving space provided for the tie rod, which ridge is preferably designed as a reinforcement element, in particular with a thickened diameter, and/or is provided with at least one reinforcement rib.

Furthermore, the invention relates to a method for the production of an axle support, in particular according to one of Claims 1 through 20, with at least the following steps: Placement of a steering housing in its entirety or in parts into a predetermined position of a casting mold, and subsequent casting of the axle support using the casting mold.

Alternatively or in addition, a method is provided for the production of an axle support, in particular according to one of Claims 1 through 20, provided with at least the following steps: Casting the axle support and subsequent connecting of the steering housing, in its entirety or in parts, in a predetermined position in and/or on the axle support.

A further development of the invention provides that after casting, the axle support is first solution annealed, then the steering housing in its entirety or in parts is connected into and/or onto the axle support, and finally the axle support together with the steering housing is heat treated.

It can be advantageous if, after the steering housing in its entirety or in parts is connected into and/or onto the axle support by adhesion, the adhesive connection is coated, preferably provided with a rubber coating or painted. The adhesive connection is thereby protected in particular from external weather influences.

Furthermore, it can be advantageous if the materially bonded connection is made by gluing essentially over the entire length of the steering housing.

It has proven especially advantageous if the casting takes place in permanent molds, using pressure. However, it can also be advantageous if the casting takes place in chill molds, utilizing gravity.

A further development of the invention provides that after integration of the steering housing into the axle support, the latter is machined together with the steering housing; in particular, necessary receptacles or recesses are produced.

Advantageous embodiments of the invention are also evident from the following and from the priority application DE 10 2009 031 961.1, whose disclosure or content is incorporated or integrated into the present application by explicit reference, as belonging to the object of the present application.

It can be advantageous if at least one pipe or hollow body that functionally supports the axle support and is produced separately from the casting of the axle support is introduced into the single-piece cast axle support. For certain uses, it can be advantageous if the pipe is affixed to the single-piece cast axle support. For certain applications, it can be advantageous if the pipe is introduced into the single-piece cast axle support and affixed to the single-piece cast axle support. For other uses, it can be advantageous if the pipe is fitted into the single-piece cast axle support. For certain intended uses, however, it can also be advantageous if the pipe is introduced and fitted into the single-piece cast axle support. For particular intended uses, it can also be expedient if the pipe is affixed to the single-piece cast axle support. Finally, however, it can also be advantageous for particular uses if the pipe is introduced and fitted into the single-piece cast axle support and affixed to the single-piece cast axle support.

Such a pipe enables optimization of the axle support in particular with regard to the demands made on an axle support for comfort, safety and rigidity.

It has specifically been found, on the one hand, that a pipe produced separately and integrated into the single-piece cast axle support, depending on the arrangement within the axle support, can absorb wheel forces and absorb spring or damper forces, tensile and pressure shocks. In particular, a pipe disposed in a transverse direction in the single-piece cast axle support results in a significant improvement of the transverse rigidity, but also of the torsional rigidity. In addition, according to the invention, the demands made for rigidities, natural frequencies and crash behavior can be optimized or even better fulfilled by means of the at least one pipe integrated into the single-piece cast axle support.

In this connection, the axle support can still be configured to be relatively light, since the pipe is a hollow profile, whereby the cavity advantageously can be used functionally.

In order to suppress the transmission of noises, in particular roadway noises, and vibrations, in particular wheel vibrations, but also in order to reinforce the pipe itself, the cavity of the pipe can advantageously be provided with a damping material, preferably by foam-filling the cavity with aluminum.

So-called APM® (Advanced Pore Morphology Foam) pearls are particularly suitable as damping material. Through heat treatment, the metallic material introduced into the cavity of the pipe can be foamed up into metallic foam balls, preferably of aluminum, of different sizes.

Besides the advantageous damping properties of a pipe filled in particular with the aforementioned material, which have been mentioned, such a pipe also exhibits advantageous crash behavior.

Alternatively, the cavity of the pipe is expediently suitable for pulling through cable strands, conduits and/or cable runs that are present, which then lie in the pipe advantageously protected from external influences.

However, the cavity can also be used advantageously as storage volume for compressed air, in particular for the operation of air cushions.

A further development of the invention provides that the axle support can be a front axle support or a rear axle support, whereby in a preferred embodiment, the latter has two receptacles or recesses, in each instance, spaced at a distance from one another in the longitudinal direction of the vehicle, for the support points for pivot support of each of two wheel guiding elements, such as transverse arms or wishbones, and receptacles for attaching the axle support as a prefabricated unit, together with preassembled assemblies, to the vehicle structure. In addition, it can be advantageous if the one-piece cast axle support has receptacles or recesses preferably for attaching a stabilizer, for supporting a torque arm or for supporting a pendulum support and/or for attaching the steering gear. These receptacles or recesses can be connected with one another in a single piece by means of the casting process.

Such a front axle support is especially well suited for the integration or fitting in of at least one pipe.

For particular applications, it can be expedient if the axle support is made of steel.

For other uses, it can be advantageous if the single-piece cast axle support is produced from a light metal, preferably aluminum, an aluminum alloy or a magnesium alloy. In addition, it can be advantageous if the single-piece cast axle support is produced by means of pressure die-casting or gravity die-casting.

For particular uses, it can be expedient if the pipe is inserted into the axle support with a material bond. A materially bonded connection is a connection in which the components, here in particular the axle support and pipe, are connected to one another so intimately that the forces that occur during operation are transmitted through cohesion and adhesion. For other applications, it can be advantageous if the pipe is affixed on the axle support with a material bond. However, for other uses it can also be advantageous if the pipe is inserted into the axle support with a material bond, and affixed on the axle support with a material bond. Furthermore, for certain uses it can be advantageous if the pipe is introduced into the axle support with a friction bond. For particular applications, it can be expedient if the pipe is affixed on the axle support with a friction bond. For still other uses, it can be advantageous if the pipe is inserted into the axle support with a friction bond and affixed on the axle support with a friction bond. For various uses, it can be advantageous if the pipe is inserted into the axle support with a material and friction bond. For other uses, it can be advantageous if the pipe is affixed on the axle support with a material and friction bond. For particular uses, it can be expedient if the pipe is inserted into the axle support with a shape fit. For various applications, it can be expedient if the pipe is affixed on the axle support with a shape fit. For still other uses, it can be expedient if the pipe is inserted into the axle support with a shape fit and affixed on the axle support with a shape fit. For various uses, it can be advantageous if the pipe is inserted into the axle support with a material bond and a shape fit. For individual uses, it can be advantageous if the pipe is affixed on the axle support with a material bond and a shape fit. For individual applications, it can be advantageous if the pipe is inserted into the axle support with a friction bond and a shape fit. For still other applications, it can be advantageous if the pipe is affixed on the axle support with a friction bond and a shape fit. For other individual uses, it can be advantageous if the pipe is inserted into the axle support with a material and friction bond and a shape fit. For various uses, it can be advantageous if the pipe is affixed on the axle support with a material and friction bond and a shape fit.

For various applications, it can be advantageous if the steering housing is at least partially only encased in and/or on the axle support. For other applications, it can be advantageous if the pipe is at least partially additionally encased in and/or on the axle support.

For other uses, it can be advantageous if the pipe is at least partially only coated in and/or on the axle support. For individual uses, however, it can also be advantageous if the pipe is at least partially additionally coated in and/or on the axle support.

For various uses, it can be advantageous if the steering housing is at least partially only cast on, in and/or on the axle support. For individual uses, however, it can also be advantageous if the pipe is at least partially additionally cast on, in and/or on the axle support.

For other uses, it can also be advantageous if the steering housing is at least partially only coated and encased in and/or on the axle support. For other uses, however, it can also be advantageous if the pipe is at least partially encased or cast on, in and/or on the axle support. For still other uses, however, it can also be advantageous if the pipe is at least partially coated and cast on, in and/or on the axle support. Finally, for certain applications, however, it can also be expedient if the pipe is at least partially encased, coated and cast on, in and/or on the axle support.

By this means, as a whole a quasi-monolithic component is obtained, which has optimized strength values in the region of the pipe.

For particular uses, it can be advantageous if the pipe is at least partially attached in and/or on the axle support only by gluing it. For certain applications, it can be expedient if the pipe is at least partially additionally attached in and/or on the axle support by gluing it. For individual uses, it can be advantageous if the pipe is at least partially attached in and/or on the axle support only by welding, in particular by resistance spot welding. For particular applications, it can be advantageous if the pipe is at least partially additionally attached in and/or on the axle support by welding, in particular by resistance spot welding. For certain uses, it can be advantageous if the pipe is at least partially attached in and/or on the axle support only by crimping of specified regions of the axle support. For other uses, it can be expedient if the pipe is at least partially additionally attached in and/or on the axle support by crimping of specified regions of the axle support. For particular uses, it can be advantageous if the pipe is at least partially attached in and/or on the axle support only by clinching. For various applications, it can be advantageous if the pipe is at least partially additionally attached in and/or on the axle support by clinching. A person skilled in the art will find an overview of clinching in Fahrenwaldt, Hans J./Schuler, Volkmar: Praxiswissen Schweißtechnik [Practical Knowledge of Welding Technology], Berlin - Heidelberg, $2^{nd}$ revised and expanded edition, 2008, pp. 127-129. For various uses, it can be expedient if the pipe is at least partially attached in and/or on the axle support only by punch riveting. For various uses, it can be expedient if the pipe is at least partially additionally attached in and/or on the axle support by punch riveting. For still other applications, it can be advantageous if the pipe is at least partially attached in and/or on the axle support only by means of a screw connection. For still other uses, it can be advantageous if the pipe is at least partially additionally attached in and/or on the axle support by means of a screw connection.

Of course, the single-piece cast axle support in this case is designed or has a geometry in the region of the pipe to be received, such that the selected attachment method can be readily used.

When gluing, it makes sense, for example, if the section of the axle support that receives the pipe is formed as a cast hollow profile open on one side. Gluing has the advantage that attachment of the pipe in or on the axle support can be effected relatively quickly.

According to a further development of the invention, the pipe consists of a light metal, preferably of aluminum, an aluminum, zinc or magnesium alloy, or steel. An aluminum alloy has the advantage over steel that it is a light metal, so that it has a lighter weight than steel. Steel, in contrast, is characterized by a higher modulus of elasticity, which is beneficial in particular with regard to a desired increase in the rigidity of an axle support. But so-called hybrid aluminum can also be used advantageously for manufacturing the pipe.

For particular uses, it can be advantageous if the pipe is profiled to increase its rigidity, in particular if it consists of an aforementioned light metal. For certain applications, it can be advantageous if such a pipe is textured. For individual uses, however, it can also be expedient if such a pipe is profiled and textured.

For particular applications, it can be advantageous if such a pipe has only at least one reinforcement notch. For certain uses, it can be advantageous if such a pipe additionally has at least one reinforcement notch. Advantageously, the at least one reinforcement notch can be provided only on the inner surface of the pipe. For other uses, it can be advantageous if the at least one reinforcement notch is additionally provided on the outer surface of the pipe. For various applications, however, it can also be advantageous if the at least one reinforcement notch is provided only on the outer surface of the pipe.

For other uses, it can be advantageous if such a pipe has only at least one reinforcement rib. For certain uses, however, it can also be advantageous if such a pipe additionally has at least one reinforcement rib. Advantageously, the at least one reinforcement rib can be provided only on the inner surface of the pipe. For certain uses, it can be advantageous if the at least one reinforcement rib is additionally provided on the outer surface of the pipe. For still other applications, however, it can also be advantageous if the at least one reinforcement rib is provided only on the outer surface of the pipe.

For certain uses, it can be advantageous if such a pipe has only at least one reinforcement bead. For individual uses, however, it can also be advantageous if such a pipe additionally has at least one reinforcement bead. Advantageously, the at least one reinforcement bead can be provided only on the inner surface of the pipe. For certain other uses, it can be advantageous if the at least one reinforcement bead is additionally provided on the outer surface of the pipe. For still other applications, however, it can also be advantageous if the at least one reinforcement bead is provided only on the outer surface of the pipe.

For other applications, it can be advantageous if such a pipe has only at least one reinforcement bulge. For individual applications, it can be expedient if such a pipe additionally has at least one reinforcement bulge. Advantageously, the at least one reinforcement bulge can be provided only on the inner surface of the pipe. For certain other uses, it can be advantageous if the at least one reinforcement bulge is additionally provided on the outer surface of the pipe. For still other applications, however, it can also be advantageous if the at least one reinforcement bulge is provided only on the outer surface of the pipe.

It can be expedient if the cast axle support is produced from a different material than the at least one pipe, preferably a different aluminum alloy, whereby the different materials, preferably different aluminum alloys, preferably differ in their melting points or alloys or alloy components.

In this connection, it can be expedient if the wall thickness of the pipe is 0.5 to 4 mm, and the diameter of the pipe is 10 to 50 mm.

The pipe is preferably bent one or more times by means of a shaping process. A pipe structure formed with internal high pressure (IHP) is not one of the preferred embodiment variants, since the IHP method is relatively cost-intensive.

It is expedient if the pipe has essentially an oval-shaped cross section.

It can be advantageous if the pipe follows essentially the contour of a specified section within the axle support.

It is expedient if the pipe, where it crosses the prescribed receptacles or recesses of the single-piece cast axle support, is likewise provided with corresponding receptacles or recesses.

According to a further development of the invention, the pipe runs transverse to the longitudinal direction of the vehicle, and preferably from a receptacle for fastening the axle support to the vehicle structure to the opposite receptacle for fastening the axle support to the vehicle structure, whereby the pipe itself preferably helps form these receptacles, whereby the receptacles are preferably provided on outriggers.

Furthermore, it can be advantageous if the pipe or another pipe is essentially configured in U shape, whereby the section that joins the two free branches of the U-shaped pipe runs transverse to the longitudinal direction of the vehicle, and the free branches of the U-shaped pipe then run forward in the longitudinal direction of the vehicle and the direction of travel, whereby they preferably cross a pipe that may run transverse to the longitudinal direction of the vehicle and preferably from a receptacle for fastening the axle support to the vehicle structure to the opposite receptacle for fastening the axle support to the vehicle structure, whereby the free branches of the U-shaped pipe preferably pass through the pipe that runs transversely.

In addition, the invention relates to a method for the production of an axle support, with at least the following steps: Placement of a pipe of a predetermined contour into a predetermined position of a casting mold, and subsequent casting of the axle support using the casting mold.

Alternatively or in addition, a method is provided for the production of an axle support, with at least the following steps: Casting the axle support and subsequent attachment of the at least one pipe of a predetermined contour in a predetermined position in and/or on the axle support.

A further development of the invention provides that after casting, the axle support is first solution annealed, then the at least one pipe is attached into and/or onto the axle support, preferably by crimping, and finally the axle, support together with the pipe is heat treated.

It can be advantageous if, after attachment of the at least one pipe into and/or onto the axle support by gluing it, the adhesive connection is coated, preferably provided with a rubber coating or painted. The adhesive connection is thereby protected, in particular, from external weather influences.

Furthermore, it can be advantageous if attachment takes place by gluing essentially over the entire length of the at least one pipe.

It has proven especially advantageous if casting takes place in permanent molds, using pressure. However, it can also be advantageous if casting takes place in chill molds, utilizing gravity.

A further development of the invention provides that after the at least one pipe has been affixed on or inserted into the axle support, the latter is machined together with the pipe; in particular, excess lengths of the pipe that may be present are removed, and in particular, necessary receptacles or recesses are produced.

The invention will be explained below on the basis of exemplary embodiments, which are shown in the drawing. The figures show the following:

FIG. 1 in a top view at a slant from above, an axle support that is produced in a single piece with a steering housing, FIG. 2 in a top view at a slant from below, an axle support that is produced in a single piece with a steering housing, FIG. 3 in a top view at a slant from above, an axle support with steering housing and some steering components, FIG. 4 in a side view, a cross section through another axle support, looking toward the receptacle for the transmission stages, FIG. 5 in a side view from below, a cross section through the axle support according to FIG. 4, looking toward the receptacle for the transmission stages, FIG. 6 in a side view at a slant from above, a cross section through the axle support according to FIG. 4, looking toward the receptacle for the transmission stages, FIG. 7 a pipe of a predetermined contour for placement into a casting mold, FIG. 8 an axle support with encased pipe according to FIG. 7, in the non-machined state, and FIG. 9 an axle support according to FIG. 8, with encased pipe, in the machined state, with excess pipe length.

If the same reference numbers are used in FIG. 1 through 9, these designate the same parts, so that for the purpose of avoiding repetition, it is not necessary to discuss a component again that has already been described, when describing each figure. The objects contained in the figures are shown as wire-frame models.

The front axle support 12 for motor vehicles shown in FIG. 1 through 6 has a basic body, preferably in the form of a frame, and includes two receptacles 14, 16, in each instance, spaced apart from one another in the longitudinal direction F of the vehicle, for the support points for pivot support of each of two transverse control arms, not shown here. In this connection, the receptacle 14 for the first support point of the transverse control arm, not shown here, is preferably formed by two outrigger receiving members 14a, 14b, each of which is provided in an outrigger 24, 26 that extends from the basic body. The receptacle 16 for the second transverse control arm, not shown here, is provided on the basic body, and is formed by two attachment points 16a, 16b with a transverse control arm clamp, not shown here, to be affixed to it, whereby the receptacle 16 can also be formed by two outrigger receiving members, which can then each be provided in an outrigger extending from the basic body.

The front axle support 12 furthermore has a receptacle 22 for supporting a torque arm, not shown here.

Furthermore, in each instance, two first receptacles 18 and two second receptacles 20 are provided for attaching the front axle support to the vehicle structure. The second receptacle 20 is integrated into an outrigger 28 that proceeds from the basic body, and preferably is connected directly to the front receptacle 14, in the direction of travel FR, for supporting each of the wheel guiding elements.

In the front axle support 12 according to the invention, the receptacles 14, 16, 18, 20, 22 are connected with one another in a single piece, by means of casting.

The front axle support 12, in the transverse direction, has a reinforcement element 30 connecting the outriggers 28, in which the receptacle 22 for the support of the torque arm is disposed.

Figure 2:
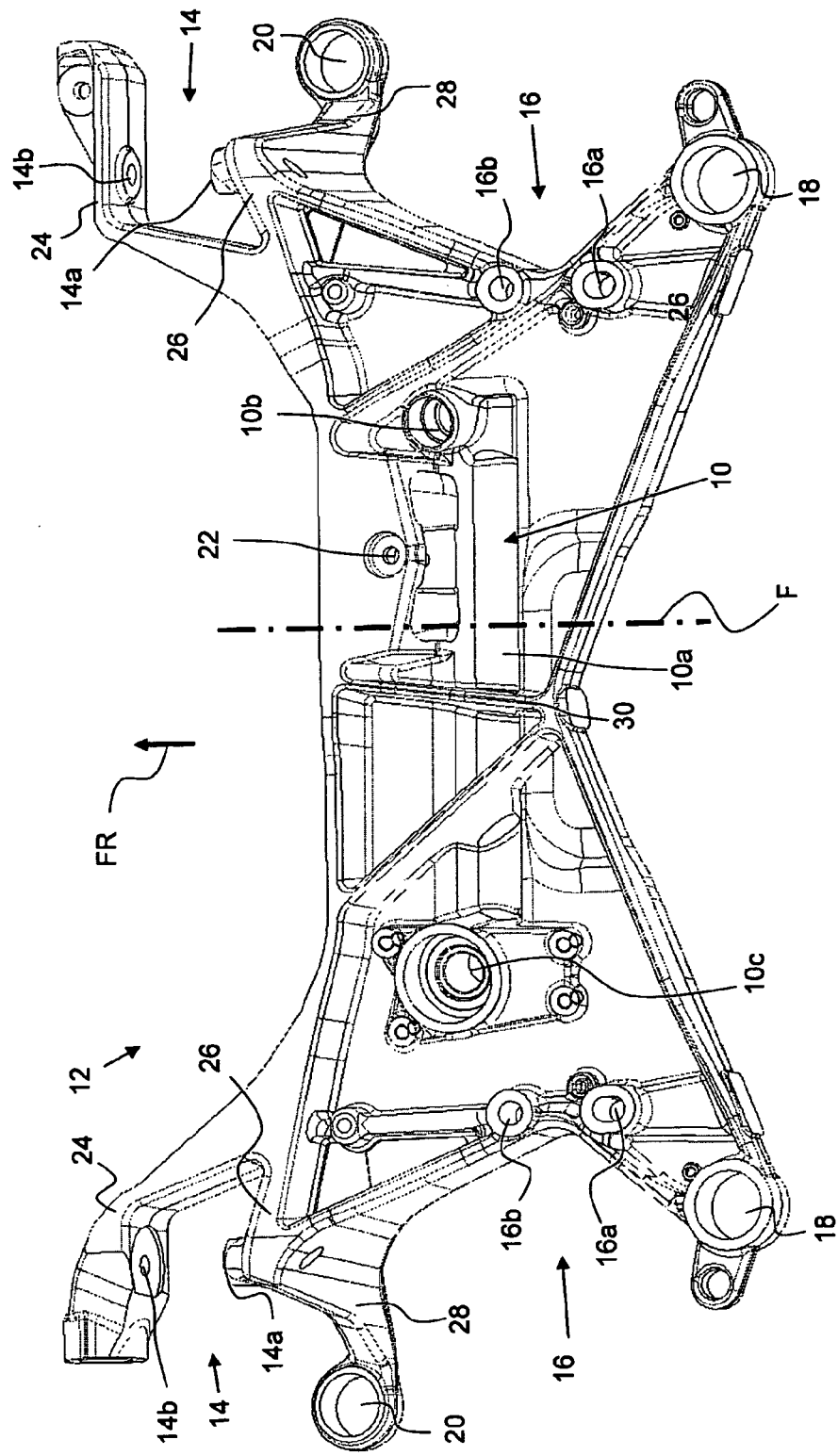
Figure 3:
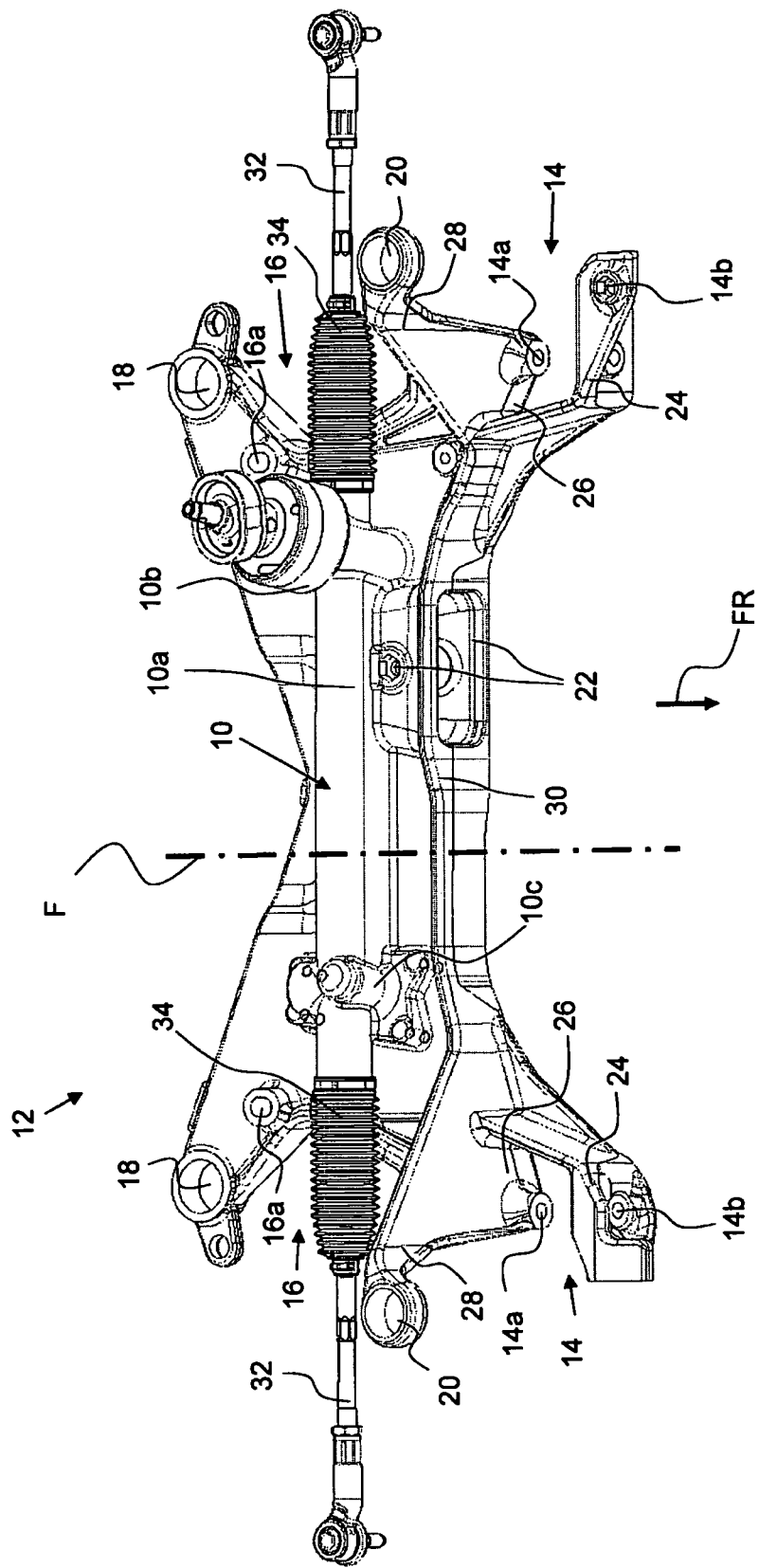

According to FIG. 1 through 3, the front axle support 12 according to the invention has a steering housing 10, which is produced in a single piece with the front axle support 12. The steering housing 10 comprises a tubular hollow body 10a running transverse to the vehicle longitudinal axis F and over approximately the width of the front axle support, disposed approximately centered between the receptacles 14, 16, in which body a steering rod, preferably in the form of a gear rack, is disposed in axially movable or displaceable manner. The steering rod is connected at its ends, by way of joints and tie rods 32, to steerable wheels, not shown here. To protect the joints, a bellows 34 is disposed over each of them.

The steering housing 10 is preferably provided for an electrical rack-and-pinion steering system, which has, along with the steering housing 10, the steering rod and the tie rods 32, among other things a sensor, an ECU (engine control unit), an electric servomotor and transmission stages, among other things. These parts and their interaction are fundamentally known.

In the present case, the steering housing 10 comprises not only the tubular hollow body 10a but also a receptacle 10b for the threaded spindle or steering shaft, which is driven by the steering wheel. Also disposed in this receptacle 10b is at least one sensor, which registers the corresponding steering torque and steering speed when a steering motion is executed by the driver. These data are conveyed, as an electrical signal, to the ECU or control device, which calculates the necessary steering support and actuates the servomotor on the basis of the calculated results.

The servomotor, together with the ECU or control device, is preferably disposed on the underside of the front axle support 12, whereby their housing is advantageously part or parts of the steering housing 10.

The servomotor transmits the optimal servo moment, by way of a worm gear or recirculating ball gear, to the gear rack of the electrical rack-and-pinion steering system.

Preferably, the steering housing 10 comprises a corresponding receptacle 10c for the worm gear or recirculating ball gear or bevel gear system of the servomotor for this purpose.

As FIG. 2 makes clear, this receptacle 10c is preferably accessible only from below.

Analogously, the servomotor and preferably also the ECU are disposed on the underside of the front axle support 12.

FIG. 1 through 3 show the front axle support according to the invention, already in the machined state.

This state is reached by machining the front axle support 12 after casting, in such a way that all necessary receptacles or recesses are introduced, preferably 14, 16 for the support points for pivot support for each of two wheel guiding elements, 18, 20 for attaching the axle support 12 as a prefabricated unit, together with preassembled assemblies, on the vehicle structure, 22 for supporting a torque arm, 10b for supporting the steering shaft, and 10c for receiving the bevel gear system of the servomotor.

The transverse rigidity of the front axle support 12 is increased significantly by the steering housing 10 produced in a single piece with the front axle support 12.

Furthermore, a significant increase in the torsional rigidity of the front axle 12 has been found.

According to the invention, it is also possible for the steering housing 10 or parts thereof, in particular the tubular hollow body 10a, to be placed in a casting mold, preferably in a permanent mold of a pressure die-casting system, in a predetermined position. Casting of the single-piece cast front axle support 12 then takes place, in such a way that the tubular hollow body 10a is encased in or coated by the axle support 12.

Figure 4:
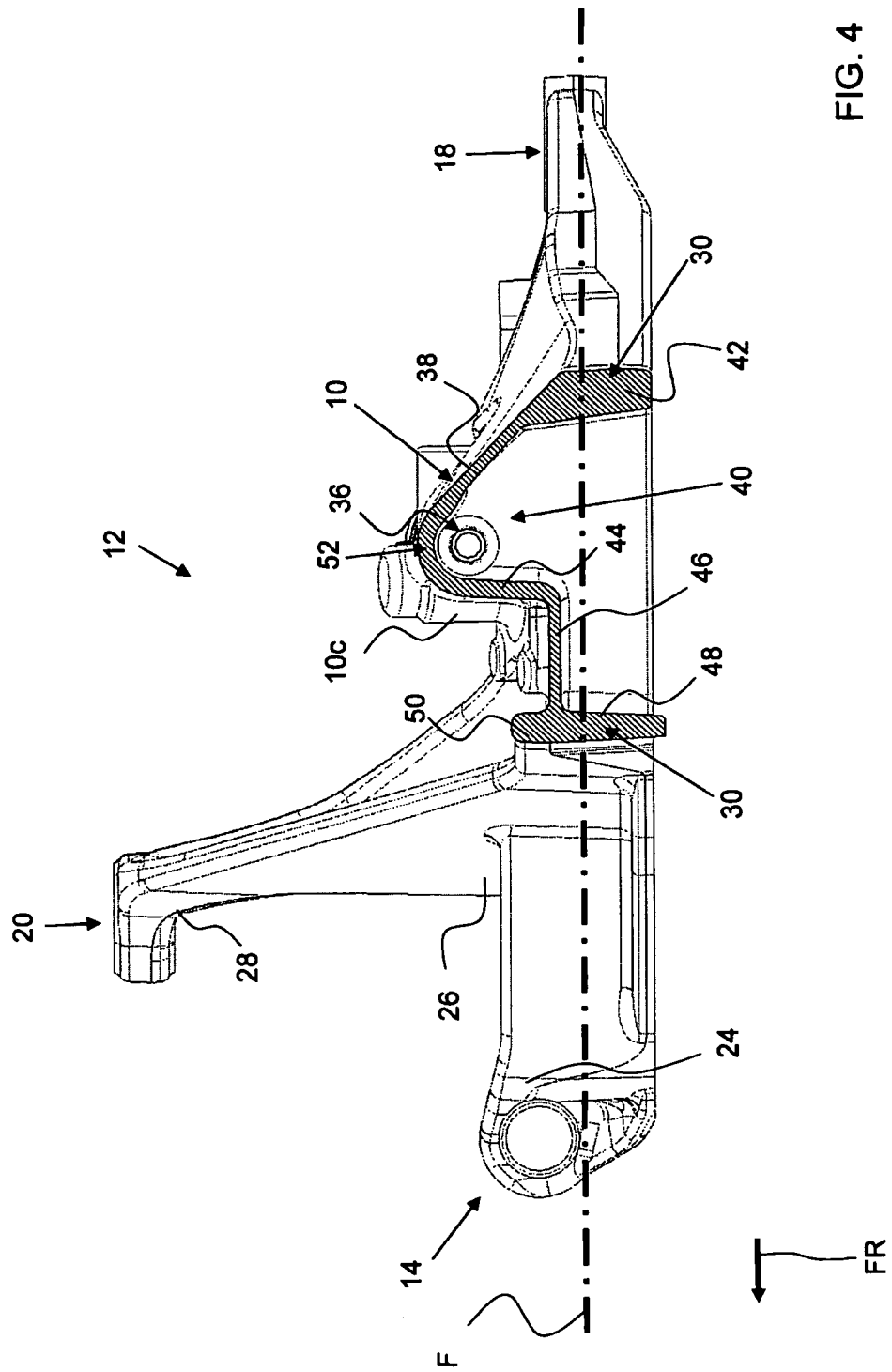
Figure 5:
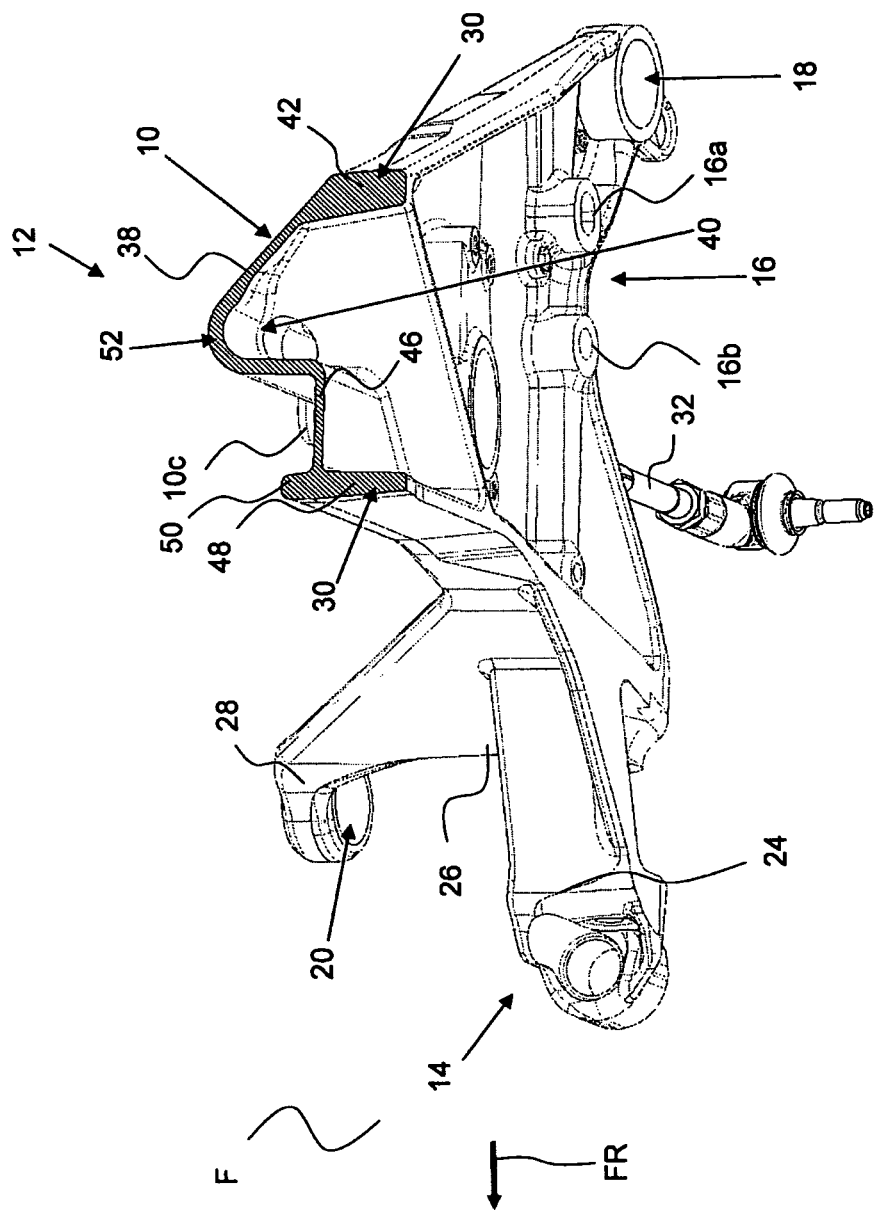
Figure 6:
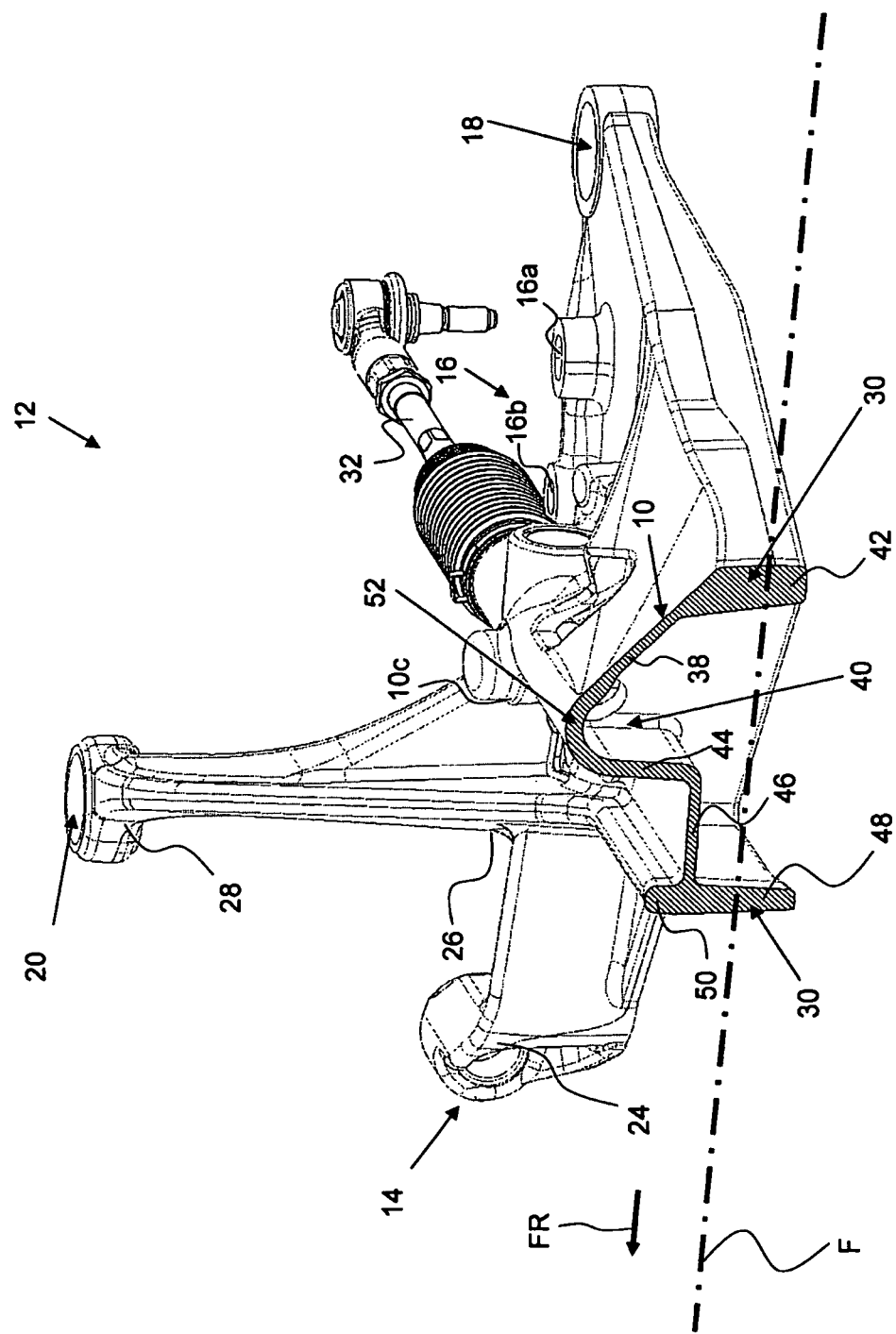

According to FIG. 4 through 6, the front axle support 12 has a steering housing 10 that is produced in a single piece with the front axle support 12, and comprises a roof-like hollow profile open toward the bottom, in which the steering rod 36 is displaceably disposed.

The roof-like configuration runs in the transverse direction of the front axle support 12, i.e. transverse to the direction of travel FR, between the receptacle 10b for the steering shaft and the receptacle 10c for the transmission stages.

Particularly to improve the rigidity of the front axle support, the roof-like configuration of the steering housing 10 has a section 38 that slopes in the longitudinal direction, which drops downward beginning approximately above the receiving space 40 provided for the steering rod 36, and transitions directly into the rear transverse wall 42, in the direction of travel FR, which wall delimits the front axle support 12, whereby the transverse wall 42 is preferably designed as a reinforcement element 30 with thickened wall diameter.

To improve the rigidity of the front axle support, the roof-like configuration of the steering housing 10 also has a section 44 that runs essentially vertically, which section runs downward beginning approximately laterally next to the receiving space 40 provided for the steering rod 36, and subsequently transitions to an approximately horizontal section 46 and then to a front transverse wall 48, in the direction of travel, which wall delimits the front axle support, whereby the transverse wall 48 is preferably configured as a reinforcement element 30 with a reinforced wall diameter, and is provided with at least one reinforcing rib 50.

In addition, the roof-like configuration has a rounded-off ridge 52, matched to the contour of the steering rod, that runs transverse to the direction of travel FR, approximately above the receiving space 40 provided for the steering rod 36, which ridge forms an additional reinforcement element.

Figure 7:
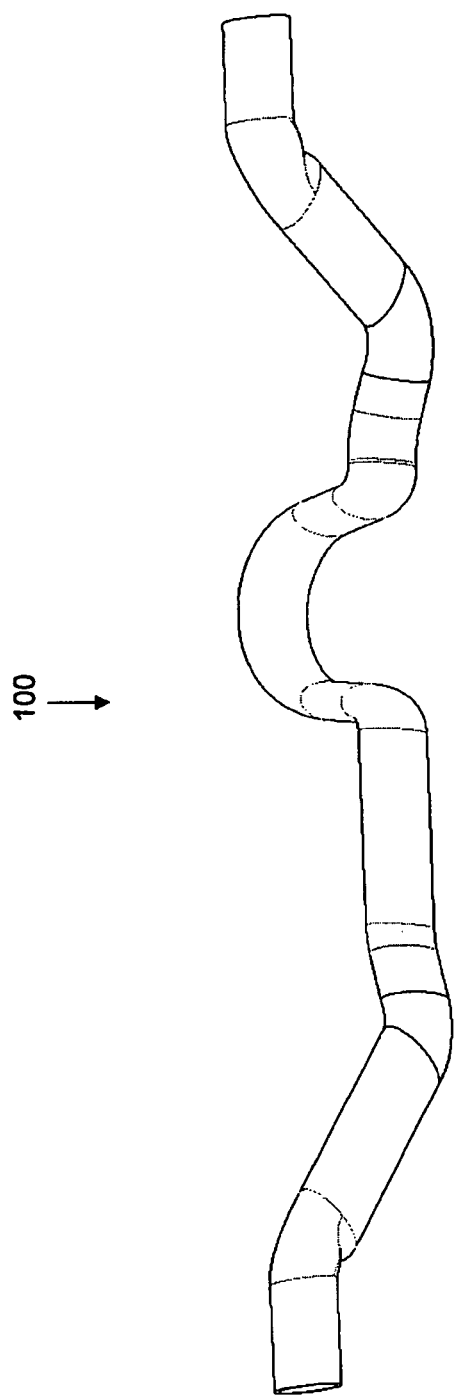

FIG. 7 shows a pipe 100 of steel which, already bent multiple times, has a predetermined contour that corresponds essentially to the contour of that section of the single-piece cast axle support 120 into which the pipe 100 is to be introduced to functionally support the axle support 120.

After completion of the pipe 100, it is placed in a casting mold, preferably in a permanent mold of a pressure die-casting system, in a predetermined position. Casting of the single-piece cast front axle support 120 then takes place, in such a way that the pipe 100 is encased in or coated by the axle support 120.

Figure 8:
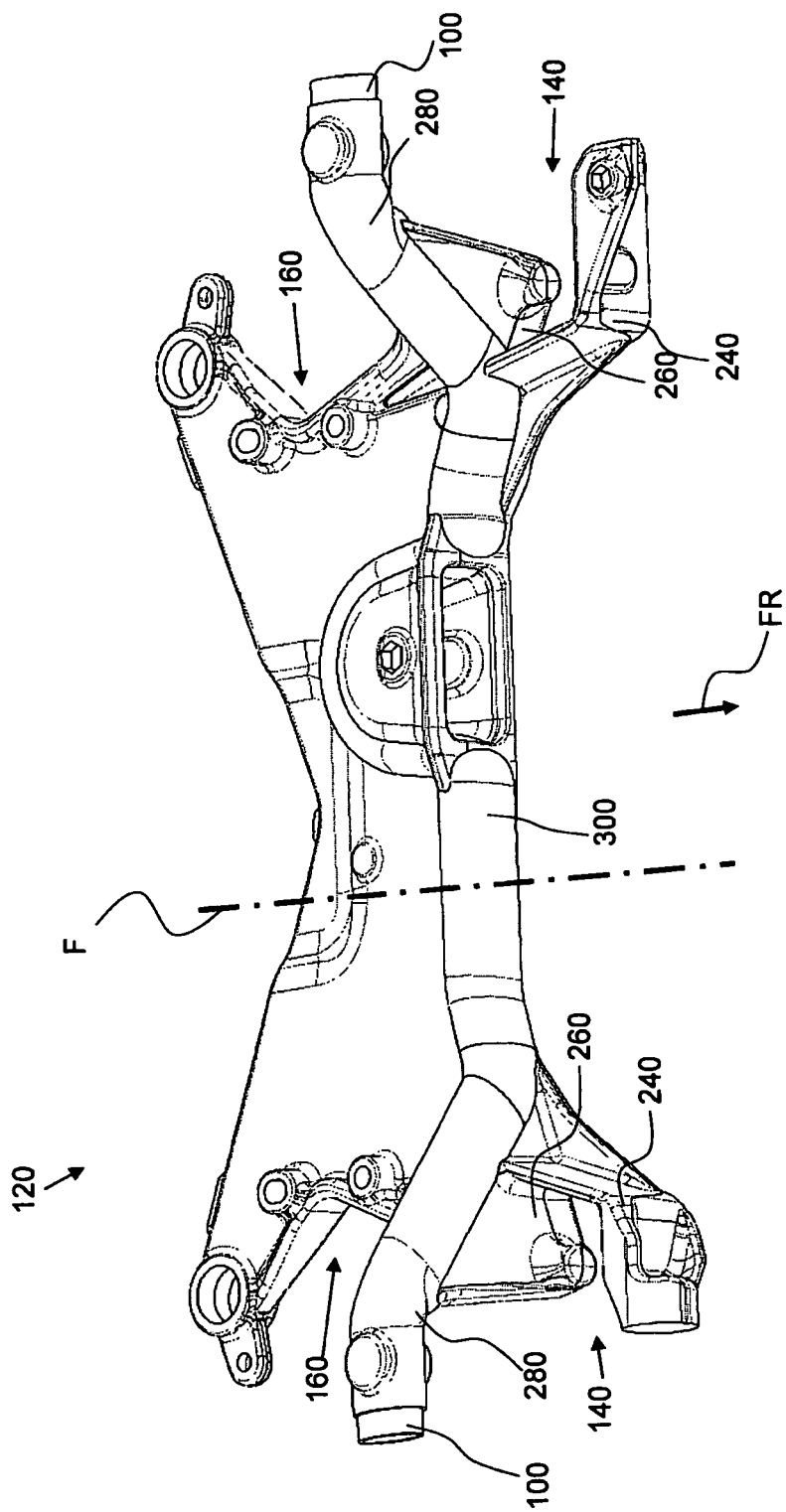

FIG. 8 shows the result of this casting procedure, namely a front axle support 120 with the pipe 100 known from FIG. 7, now encased.

This front axle support 120 undergoes machining in a further step. In particular, all necessary receptacles or recesses are produced, preferably 140, 160 for the support point for pivot support of each of two wheel guiding elements, 180, 200 for attaching the axle support 120 as a prefabricated unit, together with preassembled assemblies, on the vehicle structure, and 220 for supporting a torque arm.

Figure 9:
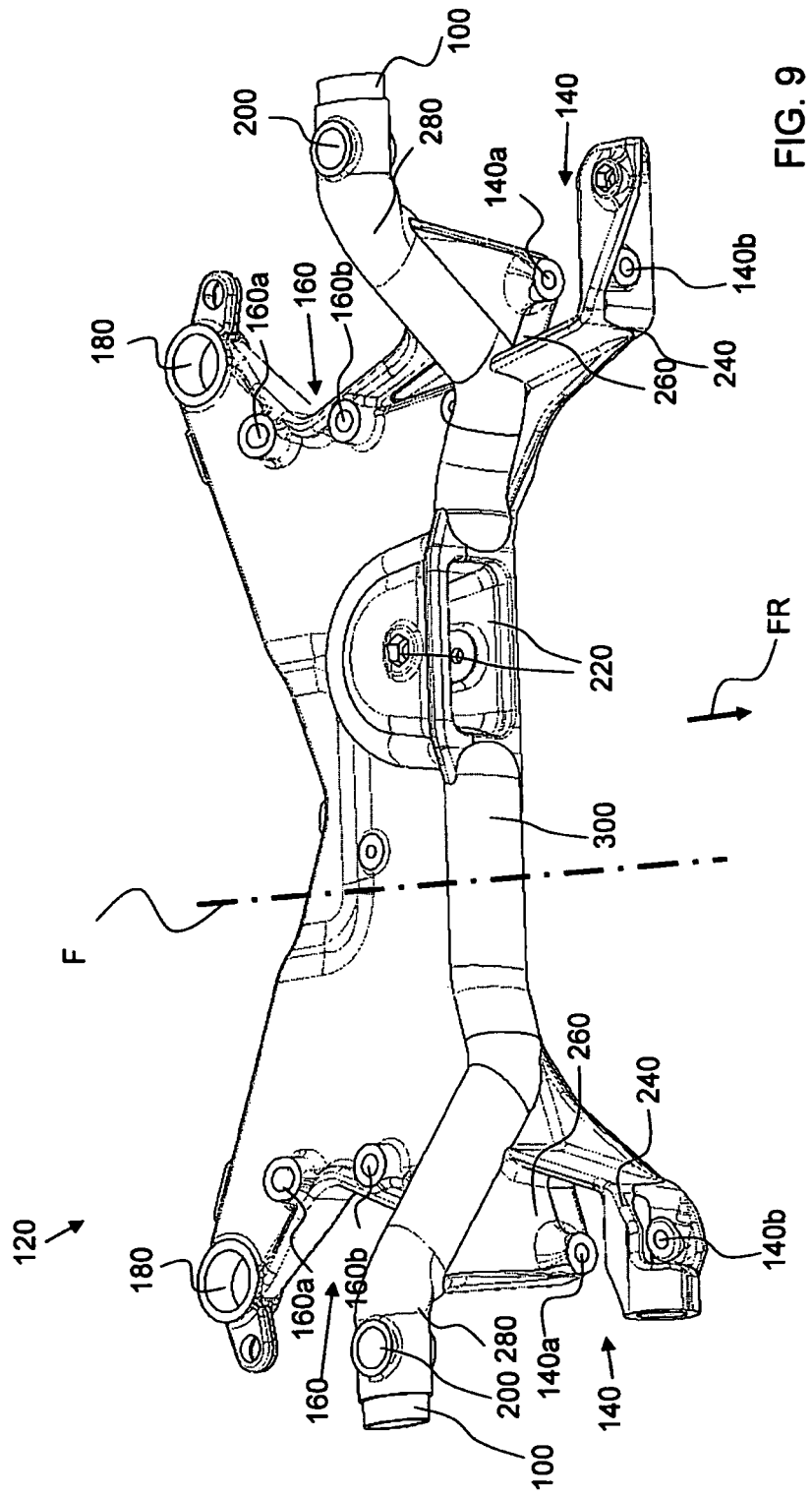

Analogously, FIG. 9 shows the front axle support 120 according to FIG. 8 with encased pipe 100, now however in the machined state, where the encased pipe 100 has an excess length.

The front axle support 120 for motor vehicles has a basic body, preferably in the form of a frame, and comprises two receptacles 140, 160, in each instance, spaced apart from one another in the vehicle longitudinal direction F, for the support points for pivot support of each of two transverse control arms, not shown here. In this connection, the receptacle 140 for the first support point of the transverse control arm, not shown here, is preferably formed by two outrigger receiving members 140a, 140b, each of which is provided in an outrigger 240, 260 that proceeds from the basic body. The receptacle 160 for the second support point of the transverse control arm, not shown here, is provided on the basic body, and is formed by two attachment points 160a, 160b with a transverse control arm clamp, not shown here, that can be attached to it, whereby the receptacle 160 can also be formed by two outrigger receiving members, which can then each be provided in an outrigger proceeding from the basic body.

The front axle support 120 furthermore has a receptacle 220 for supporting a torque arm, not shown here.

Furthermore, in each instance, two first receptacles 180 and two second receptacles 200 are provided for attaching the front axle support to the vehicle structure. The second receptacle 200 is integrated into an outrigger 280 that proceeds from the basic body, and preferably is connected directly to the front receptacle 140, in the direction of travel FR, for supporting each of the wheel guiding elements.

In the front axle support 120 according to the invention, the receptacles 140, 160, 180, 200, 220 are connected with one another in a single piece by means of casting.

The front axle support 120 has a reinforcement element 300 connecting the outriggers 280, in the transverse direction, in which element the receptacle 220 for the support of the torque arm is disposed.

The pipe 100 shown in FIG. 7 is now cast into this existing reinforcement element 300, whereby the pipe 100 is preferably also integrated into the outriggers 280 and has corresponding receptacles 200 for attaching the front axle support 120 to the vehicle structure. In the present exemplary embodiment, the pipe 100 surrounds the receptacle 220 in a U shape. Such a path of the pipe is not mandatory, however. To increase the transverse rigidity of the axle support, it can also be expedient if the pipe 220 only runs transverse to the longitudinal direction F of the vehicle.

The transverse rigidity of the front axle support 120 between the receptacles 140 for the support points for pivot support of each of two transverse control arms, not shown here, is increased significantly by the encased pipe 100.

In this connection, it has been found to be especially advantageous that the encased pipe 100 also has, at the same time, the receptacles 200 for attaching the front axle support 120 to the vehicle structure.

Furthermore, a significant increase in the torsional rigidity of the front axle 120 has been found.

For better illustration, the encased pipe 100 is shown not yet cut to length or shortened.

The invention claimed is:

1. An axle support, cast in a single piece axle body, for motor vehicles, wherein a steering housing is provided which is produced in its entirety or partially with the axle body, or which is connected with the axle body, in its entirety or partially, by a material bond, wherein the steering housing has a recess for receiving transmission stages of a servomotor, wherein the recess begins under the axle body or beneath an imaginary horizontal plane spanned by the axle body and is accessible from there, and ends on the axle body or above the imaginary horizontal plane spanned by the axle body and is closed there.

2. The axle support according to claim 1, wherein the part of the steering housing cast with the axle body is configured as a half-shell.

3. The axle support according to claim 1, wherein the steering housing has at least one tubular hollow body for receiving a steering rod, wherein the at least one tubular hollow body is disposed on the axle body or above the imaginary horizontal plane spanned by the axle body.

4. The axle support according to claim 1, wherein the steering housing has a receptacle for supporting a steering shaft, where the receptacle begins on the axle body or above the imaginary horizontal plane spanned by the axle body, and ends under the axle body or beneath the imaginary horizontal plane spanned by the axle body.

5. The axle support according to claim 1, wherein the steering housing produced separately from the casting of the axle body is encased and/or cast on and/or coated, in its entirety or in parts, in and/or on the axle body.

6. The axle support according to claim 1, wherein the steering housing is attached, in its entirety or in parts, in and/or on the axle body, by gluing or by welding.

7. The axle support according to claim 1, wherein the axle support is a front axle support or rear axle support having two receptacles or recesses, in each instance, spaced apart from one another in the longitudinal direction of the vehicle, for the support points for pivot support of each one of two wheel guiding elements, for attaching the axle support as a prefabricated unit, together with preassembled assemblies, on the vehicle structure, wherein the axle support is produced as a component cast as a single piece axle body with these receptacles or recesses, and connecting them with one another.

8. The axle support according to claim 1, wherein the axle body is produced from light metal.

9. The axle support according to claim 1, wherein the axle body is produced using a light-metal casting process.

10. The axle support according to claim 1, wherein the steering housing consists of a light metal.

11. The axle support according to claim 1, wherein the part of the steering housing cast in a single piece together with the axle body is configured as a hollow profile open toward the bottom.

12. The axle support according to claim 1, wherein the part of the steering housing cast in a single piece together with the axle body is configured in roof-like manner.

13. The axle support according to claim 12, wherein the roof-like configuration is provided in the transverse direction of the axle body, at least partially between the part of the steering housing for receiving a steering shaft and the part of the steering housing for receiving transmission stages.

14. A method for the production of the axle support according to claim 1, with at least the following steps:
Placement of a steering housing or parts thereof into a predetermined position of a casting mold, and subsequent casting of the axle body using the casting mold.

15. A method for the production of the axle support according to claim 1, with at least the following steps: Casting of the axle body and subsequent materially bonded connection of the steering housing in a predetermined position in and/or on the axle body.

16. An axle support, cast in a single piece axle body, for motor vehicles, wherein a steering housing is provided which is produced in its entirety or partially with the axle body, or which is connected with the axle body, in its entirety or partially, by a material bond, wherein construction space for the servomotor together with an ECU is provided under the axle support or beneath an imaginary horizontal plane spanned by the axle body.

17. An axle support, cast in a single piece axle body, for motor vehicles, wherein a steering housing is provided which is produced in its entirety or partially with the axle body, or which is connected with the axle body, in its entirety or partially, by a material bond, wherein the steering housing has profilings and/or reinforcement notches, ribs, beads and/or bulges, wherein these are provided on the inner and/or the outer surface of a pipe.

18. An axle support, cast in a single piece axle body, for motor vehicles, wherein a steering housing is provided which is produced in its entirety or partially with the axle body, or which is connected with the axle body, in its entirety or partially, by a material bond, wherein the axle body is produced from a different material than the steering housing.

19. An axle support, cast in a single piece axle body, for motor vehicles, wherein a steering housing is provided which is produced in its entirety or partially with the axle body, or which is connected with the axle body, in its entirety or partially, by a material bond, wherein the part of the steering housing cast with the axle body is configured in roof-like manner, wherein the roof-like configuration of the steering housing has a sloping section that drops off in a downward direction, beginning approximately above the receiving space for the tie rod, and transitions directly or indirectly into a transverse wall delimiting the axle body, wherein the transverse wall is configured as a reinforcement element with a thickened wall diameter, and/or is provided with at least one reinforcing rib.

20. An axle support, cast in a single piece axle body, for motor vehicles, wherein a steering housing is provided which is produced in its entirety or partially with the axle body, or which is connected with the axle body, in its entirety or partially, by a material bond, wherein the part of the steering housing cast with the axle body is configured in roof-like manner, wherein the roof-like configuration of the steering housing has a section running essentially vertically, which section, beginning approximately laterally next to the receiving space provided for the tie rod, runs downward, subsequently transitions into an approximately horizontal to sloping section and into a transverse wall that delimits the axle body, wherein the transverse wall is configured as a reinforcement element with a thickened wall diameter, and/or is provided with at least one reinforcing rib.

21. An axle support, cast in a single piece axle body, for motor vehicles, wherein a steering housing is provided which is produced in its entirety or partially with the axle body, or which is connected with the axle body, in its entirety or partially, by a material bond, wherein the part of the steering housing cast with the axle body is configured in roof-like manner, wherein the roof-like configuration has a ridge running in the transverse direction approximately above a receiving space provided for the tie rod, which ridge is configured as a reinforcement element with a thickened diameter, and/or is provided with at least one reinforcement rib.

22. A method for the production of an axle support, cast in a single piece axle body, for motor vehicles, wherein a steering housing is provided which is produced in its entirety or partially with the axle body, or which is connected with the axle body, in its entirety or partially, by a material bond, with at least the following steps: Casting of the axle body and subsequent materially bonded connection of the steering housing in a predetermined position in and/or on the axle body, wherein after casting, the axle body is first solution annealed, subsequently the steering housing or parts thereof are integrated into or onto the axle body by a material bond, and finally the axle body, together with the steering housing, is heat treated.

23. A method for the production of an axle support, cast in a single piece axle body, for motor vehicles, wherein a steering housing is provided which is produced in its entirety or partially with the axle body, or which is connected with the axle body, in its entirety or partially, by a material bond, with at least the following steps: Casting of the axle body and subsequent materially bonded connection of the steering housing in a predetermined position in and/or on the axle body, wherein after the materially bonded connection of the steering housing or parts thereof into and/or onto the axle body by means of adhesive, the adhesive connection is coated or lacquered.

24. The method according to claim 23, wherein the materially bonded connection is made by gluing essentially over the entire length of the steering housing.

25. A method for the production of an axle support, cast in a single piece axle body, for motor vehicles, wherein a steering housing is provided which is produced in its entirety or partially with the axle body, or which is connected with the axle body, in its entirety or partially, by a material bond, with at least the following steps: Casting of the axle body and subsequent materially bonded connection of the steering housing in a predetermined position in and/or on the axle body, wherein casting takes place with the application of pressure, in permanent molds.

* * * * *